United States Patent [19]

Schilling

[11] Patent Number: 5,192,361
[45] Date of Patent: Mar. 9, 1993

[54] SUBMICRON LIGNIN-BASED BINDERS FOR WATER-BASED BLACK INK FORMULATIONS

[75] Inventor: Peter Schilling, Charleston, S.C.

[73] Assignee: Westvaco Corporation, New York, N.Y.

[21] Appl. No.: 827,705

[22] Filed: Jan. 27, 1992

[51] Int. Cl.$^5$ ............... C09D 11/14; C08L 97/00; C07G 1/00

[52] U.S. Cl. ............... 106/26 R; 106/123.1; 106/30 R; 530/500

[58] Field of Search ............... 106/26, 123.1; 530/500

[56] References Cited

U.S. PATENT DOCUMENTS

| | | | |
|---|---|---|---|
| 2,525,433 | 10/1950 | Voet | 106/30 |
| 3,216,839 | 11/1965 | Webster | 106/123.1 |
| 4,797,157 | 1/1989 | Dilling et al. | 106/123.1 |
| 4,891,070 | 1/1990 | Dilling et al. | 106/26 |
| 4,892,587 | 1/1990 | Dilling et al. | 106/123.1 |
| 4,892,588 | 1/1990 | Dilling et al. | 106/123.1 |
| 4,957,557 | 9/1990 | Dimitri | 106/123.1 |
| 5,008,378 | 4/1991 | Dimitri | 530/501 |
| 5,066,331 | 11/1991 | Hutter | 106/30 |

FOREIGN PATENT DOCUMENTS 1107249 3/1968 United Kingdom .

*Primary Examiner*—Mark L. Bell
*Assistant Examiner*—Helene Klemanski
*Attorney, Agent, or Firm*—Daniel B. Reece, IV; Terry B. McDaniel; Richard L. Schmalz

[57] ABSTRACT

A method of producing a submicron lignin-based binder resin composition for black aqueous printing ink formulation having an improved storage stability wherein from 10 to 25% of the submicron lignin binder resin is replaced by acrylic resin, rosin resin, styrene-maleic anhydride copolymer resin, or a combination thereof. The submicron lignin-based resin composition functions as a grinding agent for the pigment in formulating and as a binder for the pigment in the printing process.

8 Claims, No Drawings

SUBMICRON LIGNIN-BASED BINDERS FOR WATER-BASED BLACK INK FORMULATIONS

FIELD OF INVENTION

The invention relates to improved water-based black ink formulations. In particular, the invention relates to improved small particle size lignin-based binder resins for flexographic water-borne black ink formulations.

BACKGROUND OF THE INVENTION

A growing area in the field of printing is known as flexography or flexographic ink printing. Flexographic ink printing is a branch of rotary typographic printing in which the printing is applied to a print-receiving substrate by use of a flexible relief plate with highly fluid, volatile inks which dry rapidly by evaporation. The process was originally limited to printing paper bags, but many inroads have been made in recent years to extend the process to printing various flexible packaging, textiles, newsprint, and other print-receiving substrates.

A flexographic printing ink generally contains three basic types of ingredients denominated as a solvent, a colorant, and a binder. Minor amounts of other additives also may be employed to provide the desired characteristics (i.e., rheology, viscosity, etc.) for the printing ink composition.

In recent years, increased emphasis has been placed on the use of water as the solvent, rather than an oil-based solvent. Carbon black pigment is commonly used as the colorant in both water-based and oil-based black ink formulations.

The binder component of the printing ink composition generally comprises a resin which functions primarily to increase adhesion of the pigment to the substrate, while also often acting as a dispersing medium and carrier. Acrylic polymer lattices have traditionally been employed as binders in water-based printing ink compositions. However, these acrylic binders are relatively expensive. Thus, printing ink formulators have actively sought low-cost alternative binders.

One promising source of alternative binders under evaluation is lignin. Lignin is a complex, high-molecular weight polymer occurring naturally in close association with cellulose in plants and trees. In the paper-making industry, lignin may be recovered as a by-product of the cellulose product. Depending on conditions under which the lignin is precipitated, the precipitated lignin may be either in the form of free acid lignin or a lignin salt. If lignin is precipitated at a high pH, such as about 9.5 to 10, the lignin is obtained in the form of a salt. If this lignin is further processed by washing, acidifying to a low pH, such as about 2 to 5, and further washed so as to be substantially free of salt and ash-forming ingredients, free acid lignin, known as "A" lignin, is obtained. A monovalent salt of lignin, such as an alkali metal salt or an ammonium salt, is soluble in water, whereas free acid lignin and polyvalent metal salts of lignin are insoluble in water.

It is known to employ certain amine salts of lignins as binders in aqueous printing ink compositions, as shown in commonly assigned U.S. Pat. No. 4,891,070.

It is also known to use certain lignins as binding agents for water-based ink systems incorporating pigments and/or dispersed dyes. U.S. Pat. No. 2,525,433 discloses the use of lignin dissolved in a water-miscible solvent as a binding material for a pigment in printing ink. The method of U.S. Pat. No. 2,525,433 requires the use of a solubilizing agent, generally an organic amine or alcohol, to completely dissolve the lignin particles. The resultant solution when used with pigments for ink application is limited to newsprint or other porous paper. There is no film-forming action of the lignin, and no solid particles remain after the lignin is solubilized. Adhesion to coated paper, calendared paper, and sized papers is poor with excessive rub-off resulting.

Commonly assigned U.S. Pat. No. 5,008,378 (which is hereby incorporated by reference) teaches a method of producing lignin materials which, in liquid dispersion form, comprise particles having a median particle diameter of less than about one micron, and of such uniform shape and size so as to be readily employed as film-formers and additives in other products and chemical compositions. The lignin material product comprises colloidal dispersion of monodispersed lignin particles which coalesce and dry to form a continuous film which is useful as a binder in pigment printing, coating, and composite board manufacture.

Commonly assigned U.S. Pat. No. 4,957,557 (which is hereby incorporated by reference) teaches the use of this submicron or small particle lignin to produce carbon black ink compositions. However, a major problem has recently been discovered in that inks prepared with this type of lignin are not storage stable (particularly at elevated temperatures). Over time viscosity increases and sediments are formed or gel-like inks are obtained which are extremely difficult to dilute to desired press-ready viscosities (commonly about 10 seconds as measured via a #3 Shell Cup or about 20 seconds via a #2 Zahn cup).

Therefore, it is the object of this invention to provide an improved low cost small particle size lignin binder for use in producing storage stable, low viscosity flexographic water-borne black ink formulations.

SUMMARY OF THE INVENTION

The object of this invention is met by replacing 10-25% of the submicron lignin with either acrylic resin, rosin resin, styrene-maleic anhydride copolymer resin, or a combination thereof. This substitution produces a low cost binder resin composition suitable for use in producing storage stable, low viscosity flexographic water-borne black ink formulations.

DESCRIPTION OF THE PREFERRED EMBODIMENT

As noted above, commonly assigned U.S. Pat. No. 5,008,378 teaches a method of producing submicron lignin materials which can be employed as additives in other products. This method comprises the steps of preparing an aqueous solution containing from about 12 to 18% lignin by weight, from about 2 to 15 moles ammonia, from about 4 to 12 moles formaldehyde, and from about 0.25 to 1.25 moles of sodium hydroxide or potassium hydroxide, per mole of lignin present in the solution. The solution is heated to at least about 150° F. for a sufficient time to crosslink the lignin and form a colloidal suspension of lignin particles of submicron median particle diameter, preferably, less than about 300 angstroms median particle diameter. Solids concentration of the colloidal dispersion may be from between about 15-20% by weight dry at pH 8.0-10.0. Preferably, the aqueous solution may contain about 5 moles ammonia, 6 moles formaldehyde, and 0.75 moles sodium hydroxide per mole of lignin.

As previously referenced, this submicron lignin is utilized as a binder in commonly assigned U.S. Pat. No. 4,957,557 to formulate carbon black compositions. These compositions are comprised of over 15% carbon black (on a dry weight basis), a dispersant, water, and the submicron lignin binder.

Improved low cost carbon black composition binders suitable for use in water-based black ink formulations are produced by replacing 10-25% by weight preferably 12 to 20% by weight of the submicron lignin binder taught in U.S. Pat. No. 4,957,557 with acrylic resin, rosin resin, styrene-maleic anhydride copolymer rosin, or a combination thereof.

Acrylic resins which are suitable for use in the improved binder resins compositions are styrene ($\alpha$-methylstyrene)-acrylic acid copolymers having a molecular weight in the range of about 1,000–100,000 and an acid number of about 70 to 250. Procedures for producing these acrylic resins are well known to those skilled in the art, as acrylic resins are widely used as binders in water-based inks. An excellent example of a common method for preparing acrylic resins is given in Great Britain Patent No. 1,107,249 (which is hereby incorporated by reference). Commercially available acrylic resins which are suitable for use in the improved binders include, but are not limited to, the following:
Acrysol I-62 (manufactured by Rohm and Haas),
Joncryl J-678 (manufactured by S. C. Johnson), and
Vancryl 68-5 (manufactured by Air Products).

Rosin resins which are suitable for use in the improved binder resin compositions are rosin fortified via a Diels-Alder reaction with fumaric acid or maleic anhydride, and further reacted via an esterification reaction with pentaerythritol, glycerol, glycol, polyglycols, sorbitol, or the like. These rosin resins have an acid number in the range of 150 to 220.

Other suitable, preferred rosin resins are obtained by high-temperature polyalkylene amine treatment of rosin fortified (via a Diels-Alder reaction) with fumaric acid or maleic anhydride (see Example 3). Here the ratio of polyalkylene amine to the amount of fumaric acid or maleic anhydride used for the fortification is 0.1 to 0.5 moles of amine per mole of fumaric acid or maleic anhydride. Suitable polyalklene amines are selected from the group consisting of: aminoethylpiperazine, triethylenetetramine, aminoethylethanolamine, diethylenetriamine, hydroxyethylpiperazine, ethylenediamine, and combinations thereof. These rosin resins have an acid number in the range of 130 to 200.

Procedures for producing the above suitable rosin resins are well known to those skilled in the art, as rosin resins are widely used as binders in water-based inks. An excellent example of a method for preparing rosin resins is taught in commonly assigned U.S. Pat. No. 5,066,331 (which is hereby incorporated by reference). Rosin resins which are commercially available and suitable for use in the improved binders include, but are not limited to, the following:
BKC-407 (manufactured by Westvaco),
BKC-408 (manufactured by Westvaco),
BKC-409 (manufactured by Westvaco),
Jonrez AC-201 (manufactured by Westvaco),
Jonrez SM-700 (manufactured by Westvaco),
Jonrez SM-715 (manufactured by Westvaco), and
Jonrez SM-724 (manufactured by Westvaco).

Styrene-maleic anhydride copolymers which are suitable for use in the improved binder resins compositions have a molecular weight in the range of about 1,000–5,000 and an acid number of about 150 to 300. Procedures for producing these styrene-maleic anhydride copolymer resins are also well known to skilled artisans. A styrene-maleic anhydride copolymer resin which is commercially available and suitable for use in the improved binders is SMA-1440A (manufactured by Alochem).

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

Following the methods taught in commonly assigned U.S. Pat. Nos. 4,957,557 and 5,008,378, a submicron lignin binder was produced via the following procedure. A 750 gallon reactor was charged with 2667 lbs. slurry of "A" lignin (0.8 mole) at 30.0% solids dry weight. The "A" lignin slurry was diluted to a 17.2% solids lignin concentration with 1995 lbs. of water and agitated for 60 minutes, at which time 48 lbs. of 50% solids sodium hydroxide (0.6 mole) was added to catalyze the reaction. Ammonium hydroxide containing 67.9 lbs. of ammonia (4.0 moles) of active formaldehyde was added to the mixture and agitation continued for 2 hours. A formaldehyde solution containing 144 lbs. (4.8 moles) of active formaldehyde was added and agitation continued. The reactants were heated to 185° F. and this temperature maintained for 4 hours, following which the reactants were cooled to 125° F. The final product (hereafter referred to as small particle lignin or SPL) was a colloidal lignin dispersion of 17.5% dry solids with a median particle diameter of 265 angstroms and a viscosity of 7.0 cps Brookfield at 25° C. (pH is 8.66).

A number of black inks (100 g) containing various SPL/acrylic resin combinations were formulated for evaluation via the following procedure. A series of commercially available alkali-soluble acrylic resins (see Tables I and II below) were dissolved in aqueous ammonia or monoethanolamine (at pH 8.5-9.0), and about 1.67-5.0 g were added to water and adjusted to pH 8.5. The mixture was transferred to a stainless steel container, and 1 g of Surfynol 104E (a defoamer manufactured by Air Products, Inc.) and about 4.5-5.5 g of small particle lignin were added and allowed to disperse. To certain combinations (see Table II below) were additionally added either 6% (6 g) dipropylene glycol or 10% (10 g) n-propanol. Subsequently, 18 g of CXS-220 (a carbon black manufactured by Cabot Chemicals, Inc.) were added and allowed to disperse. Finally, stainless steel shot was added and the mixture ground for about 60 minutes using a paint shaker.

Ink viscosities were determined with a #3 Shell cup, and color densities were determined with a Macbeth Color-eye from drawdowns using a #2.5 Mayer rod. The inks were compared to inks prepared with 6% Joncryl 678, and the results were listed in Tables I and II below. Negative numbers (i.e. color density values) indicate better color development.

TABLE I

Evaluation of Small Particle Lignin in
Combinations with Acrylic Resins
(18% CSX-220, pH 8.5)

| % A | % B | Viscosity After X Days of Storage at RT[a] | | | Color Density Δ - Values (%) |
|---|---|---|---|---|---|
| A: SP Lignin | B: Joncryl J-678 (NH₃) | | | | |
| 6.0 | 0 | gel* | — | — | — |
| 5.5 | 0 | gel* | — | — | — |
| 5.5 | 0.5 | 61* | 26⁰⁴ | 300³⁸+ (g) | — |
| 5.0 | 0 | gel* | — | — | — |
| 5.0 | 1.0 | 13* | 9⁴ | 11³⁸ | −0.59 (0.87) |
| 4.5 | 0 | gel* | — | — | — |
| 4.5 | 1.5 | 11* | 10⁴ | 9³⁸ | −1.09 (1.59) |
| 0 | 6.0 | 10* | 9²⁷ | 9⁴⁵ | −0 (0) |
| A: SP Lignin | B: Acrysol I-62 (NH₃) | | | | |
| 5.5 | 0.5 | 22* | 12¹⁸ (s.g.) | 11⁴⁴ | −1.48 (2.18) |
| 5.0 | 1.0 | 12* | 12¹⁸ (s.p.) | 12⁴⁴ (p) | −1.32 (1.94) |
| 4.5 | 1.5 | 13* | 11¹⁸ (s.p.) | 12⁴⁴ (p) | −1.78 (2.61) |
| A: SP Lignin | B: Vancryl 68-S (NH₃) | | | | |
| 5.5 | 0.5 | 11* | 14¹⁹ | 21⁴⁴ | −1.99 (2.93) |
| 5.0 | 1 | 11* | 10¹⁹ | 8⁴⁴ | −1.15 (1.69) |
| 4.5 | 1.5 | 9* | 8¹⁹ (s.p.) | 8⁴⁴ | −0.99 (1.03) |
| 4.0 | 2.0 | 8* | 8¹⁹ | — | −1.44 (2.12) |
| 3.0 | 3.0 | 8* | 8¹⁹ | — | −1.11 (1.63) |
| 2.0 | 4.0 | 7* | 7¹⁹ | — | −0.63 (0.93) |
| A: SP Lignin | B: Vancryl 68-S (MEA) | | | | |
| 5.5 | 0.5 | 42* | 205¹⁶ (s.p.) | — | — |
| 5.0 | 1.0 | 16* | 31¹⁶ | 68⁴¹ | — |
| 4.5 | 1.5 | 11* | 8¹⁶ | 12⁴¹ | −2.03 (2.99) |
| 0 | 6.0 | 9* | 6¹⁶ | 6⁴¹ | −1.36 (2.00) |

Superscript indicates days of storage.
[a] in seconds (Shell cup #3).
(g) gel.
(p) precipitate.
(s.g.) slight gel, stirred fluid.
(s.p.) slight precipitate.

TABLE II

Evaluation of Small Particle Lignin in
Combinations with Acrylic Resins
(18% CSX - 220, pH 8.5)

| % A | % B | Viscosity After X Days of Storage at RT[a] | | | Color Density Δ - Values (%) |
|---|---|---|---|---|---|
| A: SP Lignin | B: Vancryl 68-S, 6% Dipropylene Glycol (NH₃) | | | | |
| 5.5 | 0.5 | 36* | 85¹⁵ | 300⁴² (g) | — |
| 5.0 | 1.0 | 14* | 9¹⁵ | 7⁴² | 1.03 (1.51) |
| 4.5 | 1.5 | 8* | 9¹⁵ (s.p.) | 9⁴² | −0.67 (0.99) |
| 0 | 6.0 | 7* | 8¹⁵ | 7⁴² (s.p.) | −0.39 (0.50) |
| A: SP Lignin | B: Vancryl 68-S, 6% Dipropylene Glycol (MEA) | | | | |
| 5.5 | 0.5 | 25* | 80¹⁶ | 300+⁴¹ (g) | — |
| 5.0 | 1.0 | 13* | 12¹⁶ | 13⁴¹ | −1.19 (1.75) |
| 4.5 | 1.5 | 19* | 20¹⁶ | 19⁴¹ | −1.52 (2.24) |
| 0 | 6.0 | 7* | 8¹⁶ | 8⁴¹ | 0.97 (−1.43) |
| A: SP Lignin | B: Vancryl 68-S, 10% n-Propanol (NH₃) | | | | |
| 5.5 | 0.5 | 600*+ (g) | — | — | — |
| 5.0 | 1.0 | 38* | 42¹⁵ | 45⁴¹ | −0.99 (1.66) |
| 4.5 | 1.5 | 14* | 14¹⁵ | 14⁴¹ | −1.03 (1.51) |
| 0 | 6.0 | 11* | 15¹⁵ | 16⁴¹ | +0.99 (−1.45) |
| A: SP Lignin | B: Acrysol I-62, 6% Dipropylene Glycol (NH₃) | | | | |
| 5.5 | 0.5 | 600*+ (g) | — | — | — |
| 5.0 | 1.0 | 13* | 24¹⁴ (s.p.) | 10⁴¹ (s.p.) | −0.71 (1.01) |
| 4.5 | 1.5 | 19* | 15¹⁴ (s.p.) | 15⁴¹ (s.p.) | −1.44 (2.11) |

Superscript indicates days of storage.
[a] in seconds (Shell cup #3).
(g) gel.
(s.p.) slight precipitate.

S. C. Johnson's J-678, Air Products' Vancryl 68-S, and Acrysol I-62 manufactured by Rohm and Haas were evaluated using ammonia as base. Acrysol I-62 and Vancryl 68-S were more efficient at lower dosage (5.5% SPL, 0.5% acrylic resin). At a ratio of 5:1 (SPL: acrylic resin) low viscosity grinds with good storage stability were obtained.

When monoethanolamine was used in base grinds higher viscosities were obtained at higher lignin loadings. Grinds prepared at a ratio of 4.5:1.5 (SPL: Vancryl 68-S) had low viscosity and good storage stability.

Incorporation of 6% dipropylene glycol did not affect the viscosities of the grinds. Addition of 10% n-propanol to Vancryl 68-S (1.5%) resulted in fluid, low viscosity inks.

Drawdowns prepared with these inks had better hold-out resulting in better color strength.

EXAMPLE 2

A submicron or small particle lignin binder was produced via the procedure outlined in Example 1. Subsequently, a number of black inks (100 g) containing various SPL/rosin resin combinations were formulated for evaluation via the following procedure. A series of commercially available alkali-soluble rosin resins (see Table III below) were dissolved in aqueous ammonia or monoethanolamine (at pH 8.5-9.0), and about 1.67-5.0 g were added to water and adjusted to pH 8.5. To certain combinations were additionally added 6% (6 g) dipropylene glycol. The mixture was transferred to a stainless steel container, and 1 g of Surfynol 104E (a defoamer manufactured by Air Products, Inc.) and about 4.5-5.5 g of small particle lignin were added and allowed to disperse. Subsequently, 18 g of CXS-220 (a carbon black manufactured by Cabot Chemicals, Inc.) were added and allowed to disperse. Finally, stainless steel shot was added and the mixture ground for about 60 minutes using a paint shaker.

Inks viscosities were determined with a #3 Shell cup, and color densities were determined with a Macbeth Color-eye from drawdowns using a #2.5 Mayer rod. The inks were compared to inks prepared with 6% Joncryl 678, and the results were listed in Table III below. Negative numbers (i.e. color density values) indicate better color development.

TABLE III

Evaluation of Small Particle Lignin in
Combinations with Rosin Resins
(18% CXS - 220, pH 8.5)

| % A | % B | Viscosity After X Days of Storage at RT[a] | | | Color Density Δ - Values (%) |
|---|---|---|---|---|---|
| A: SP Lignin | B: Jonrez SM-700, 6% Dipropylene Glycol (NH₃) | | | | |
| 5.5 | 0.5 | gel* | — | — | — |
| 5.0 | 1.0 | 22* | 26¹⁴ | 32³³ | −1.52 (2.23) |
| 4.5 | 1.5 | 33* | 38¹⁴ | 72³³ | −1.65 (2.43) |
| A: SP Lignin | B: Jonrez SM-700 (MEA) | | | | |
| 5.5 | 0.5 | gel* | — | — | — |
| 5.0 | 1.0 | 25* | 42¹⁴ | 100³³ | −2.12 (3.11) |
| 4.5 | 1.5 | 9* | 8¹⁴ | 13³³ | −1.73 (2.54) |
| A: SP Lignin | B: Jonrez SM-700, 6% Dipropylene Glycol (MEA) | | | | |
| 5.5 | 0.5 | 38* | 300+¹⁴ (g) | — | — |
| 5.0 | 1.0 | 18* | 19¹⁴ | 18³³ | −1.69 (2.48) |
| 4.5 | 1.5 | 11* | 18¹⁴ | 16³³ | −1.73 (2.54) |
| A: SP Lignin | B: Jonrez SM-715 (NH₃) | | | | |
| 5.5 | 0.5 | gel* | — | — | — |
| 5.0 | 1.0 | 18* | 35³ | 123¹⁸ | — |
| 4.5 | 1.5 | 14* | 13³ | 15¹⁸ | 29⁵³ | −1.65 (2.43) |
| A: SP Lignin | B: Jonrez SM-724 (NH₃) | | | | |

TABLE III-continued

Evaluation of Small Particle Lignin in
Combinations with Rosin Resins
(18% CSX - 220, pH 8.5)

| % A | % B | Viscosity After X Days of Storage at RT[a] | | | Color Density Δ - Values (%) | |
|---|---|---|---|---|---|---|
| 5.5 | 0.5 | $86^1$ | $244^5$ (g) | $300+^{18}$ (g) | — | — — |
| 5.0 | 1.0 | $14^1$ | $19^5$ | $34^{18}$ | $52^{40}$ | −2.29 (3.37) |
| 4.5 | 1.5 | $6^*$ | $6^5$ | $7^{18}$ | $7^{40}$ (s.p.) | 0.30 (−0.44) |
| | | | | (s.p.) | | |

A: SP Lignin   B: Jonrez SM-724 (MEA)

| 5.5 | 0.5 | $189^1$ | $300+^5$ (g) | — | — | — — |
| 5.0 | 1.0 | $30^1$ | $38^5$ | $61^{18}$ | $63^{40}$ | −1.99 (2.93) |
| 4.5 | 1.5 | $11^1$ | $11^5$ | $8^{18}$ | $10^{40}$ | −1.19 (1.75) |

Superscript indicates days of storage.
[a] In seconds (Shell cup #3).
(g) gel.
(s.p.) slight precipitate.

Low viscosity grinds were obtained with 1.0% and 1.5% Jonrez SM-700, SM-715, and SM-724 using ammonia as base. The grinds containing 1.5% rosin resins showed the better shelf life. When monoethanolamine was used as base at least 1.5% of rosin resin had to be combined with small particle lignin to obtain low viscosity grinds with good storage stability. The ink prepared with 6% dipropylene glycol was better when monoethanolamine was used for pH adjustment. All grinds gave better color values when compared with grinds prepared with 6% Joncryl J-678.

EXAMPLE 3

A preferred rosin binder resin was produced via the following procedure. All reactants are measured in parts by weight. One hundred (100) parts of Rosin SS (a tall oil based rosin manufactured by Westvaco, Inc.) was heated to 200° C. under a positive nitrogen pressure. 23.75 parts of maleic anhydride was added in a single portion to the hot resin. The mixture was stirred at 200° C. for 2 hours. Over a period of 30 minutes 23.75 parts of triethylene tetramine (TETA) was slowly added to the adduct and heated to 240° C. (until all water of condensation was removed). The product was allowed to cool and the resin (hereafter referred to as Resin A) collected. For final pH adjustment, the desired amount of NH₃ or an amine was used.

Utilizing this method, a series of rosin resins were produced (see Table IV below) for evaluation using the ink formulation described in Example 2, except that Vulcan K (a carbon black manufactured by Cabot Chemicals, Inc.) was substituted for the previously used CSX-220. A commercially available rosin resin was likewise evaluated. One or two parts of small particle lignin were replaced with these various rosin-based resins and, for comparison, with the acrylic grind resin Joncryl J-678. The results are listed in Table IV below.

TABLE IV

Evaluation of Small Particle Lignin in Combination with
Auxiliary Rosin Grind Resins
18% Vulcan K, 9% Binder

| Binder Composition[a] | | | | Color |
|---|---|---|---|---|
| % SP Lignin | % Auxiliary Resin | pH Value | Viscosity (sec)[b] | Value (DL)[c] |
| 8 | 1 Resin A | 10 | Z-2 $23.6^1/26.6^{23}$ NS S-3 $28.5^1/36.0^{23}$ | 19.48 |
| 7 | 2 Resin A | 10 | Z-2 $25.0^1/22.0^{25}$ NS | 20.08 |

TABLE IV-continued

Evaluation of Small Particle Lignin in Combination with
Auxiliary Rosin Grind Resins
18% Vulcan K, 9% Binder

| Binder Composition[a] | | | | Color |
|---|---|---|---|---|
| % SP Lignin | % Auxiliary Resin | pH Value | Viscosity (sec)[b] | Value (DL)[c] |
| | | | S-3 $37.6^1/20.4^{25}$ | |
| 8 | 1 Resin B | 10 | Z-2 $23.3^1/22.2^{23}$ NS S-3 $22.2^1/20.5^{23}$ | 19.96 |
| 7 | 2 Resin B | 8.5 | Z-2 $29.6^1/32.5^{24}$ NS S-3 $40.3^1/46.8^{24}$ | 19.44 |
| | | 10 | Z-2 $25.4^1/19.3^{25}$ NS S-3 $23.2^1/15.0^{25}$ | 20.20 |
| 8 | 1 Resin C | 10 | Z-2 $25.5^1/22.1^{23}$ NS S-3 $29.0^1/27.6^{23}$ | 19.88 |
| 7 | 2 Resin C | 8.5 | Z-2 $23.6^1/22.3^{24}$ NS S-3 $22.2^1/19.8^{24}$ | 19.32 |
| | | 10 | Z-2 $23.8^1/20.8^{25}$ NS S-3 $23.4^1/14.7^{25}$ | 21.59 |
| 7 | 2 Joncryl J-678 | 8 | Z-2 $19.8^7/20.1^{22}$ NS S-3 $17.5^1/13.2^{22}$ | 22.75 |
| | | 10 | Z-2 $21.1^7/19.9^{22}$ NS S-3 $19.2^7/19.6^{23}$ | 21.34 |

[a] Percent based on the total weight of the ink; Resin A: 100 parts Rosin SS, 23.75 parts maleic anhydride, 14.5 parts triethylene tetramine; Resin B: 100 parts Rosin SS, 23.75 parts maleic anhydride, 14.5 parts Amine HH; Amine HH is a polyamine blend (manufactured by Union Carbide) consisting of the following major ingredients: Aminoethylpiperazine 55.1–63.0% Triethylenetetramine 25.8–35.8% Aminoethylethanolamine 5.6–9.3% Diethylenetriamine 5.1–6.9% Hydrox yethylpiperazine 1.3–3.1% Resin C: 100 parts Rosin SS, 23.75 parts maleic anhydride, 14.5 parts aminoethylpiperazine; Joncryl J-678: Acrylic grind resin (S. C. Johnson).
[b] Z-2,3,4,5; Zahn cup # 2, 3, 4, 5: S-3: Shell cup #3; Superscript indicates days of storage; NS: no settling.
[c] Determined from inks diluted 1:1 with water; reference: black tile; a lower DL value indicates a darker ink.

The rosin-aminoimide resins (i.e., Resins 1, 2, and 3) were very effective in lowering and stabilizing the viscosity at one part replacement and pH 10 and at two parts replacement and pH 8.5 or 10. The decrease in viscosity over time indicated slow collapse of foam generated during grinding. Substitution with two parts Joncryl J-678 resulted in storage-stable, low-viscosity inks at either pH 8.5 or 10. However, the tinctorial strengths as indicated by the higher DL values were not as good as that of the inks containing the rosin-derived aminoimide resins.

EXAMPLE 2

A submicron or small particle lignin binder was produced via the procedure outlined in Example 1. Subsequently, a black inks (100 g) containing a SPL/styrene-maleic anhydride copolymer rosin resin combination was formulated for evaluation via the following procedure. SMA 1440A (manufactured by Alochem) was dissolved in aqueous ammonia (at pH 8.5–9.0), and about 1.67–5.0 g were added to water and adjusted to pH 8.5. The mixture was transferred to a stainless steel container, and 1 g of Surfynol 104E (a defoamer manufactured by Air Products, Inc.) and about 4.5–5.5 g of small particle lignin were added and allowed to disperse. Subsequently, 18 g of CXS-220 (a carbon black manufactured by Cabot Chemicals, Inc.) were added and allowed to disperse. Finally, stainless steel shot was added and the mixture ground for about 60 minutes using a paint shaker.

Inks viscosities were determined with a #3 Shell cup, and color densities were determined with a Macbeth Color-eye from drawdowns using a #2.5 Mayer rod. The inks were compared to inks prepared with 6% Joncryl 678, and the results were listed in Table V below. Negative numbers (i.e. color density values) indicate better color development.

TABLE V

Evaluation of Small Particle Lignin in Combinations with Styrene-Maleic Anhydride (18% CSX - 220, pH 8.5)

| A: SP Lignin | | B: SMA 1440A (NH$_3$) Viscosity After X Days of Storage at RT[a] | | | | Color Density Δ - Values (%) | |
|---|---|---|---|---|---|---|---|
| % A | % B | | | | | | |
| 5.5 | 0.5 | 600°+ (g) | — | — | — | — | — |
| 5.0 | 1.0 | 10° | 10$^{17}$ | 9$^{44}$ (s.p.) | — | −1.32 | (1.94) |
| 4.5 | 1.5 | 10° | 7$^{17}$ | 11$^{44}$ | — | −0.27 | (0.40) |

Superscript indicates days of storage.
[a] In seconds (Shell cup #3).
(g) gel.
(s.p.) slight precipitate.

The SPL/styrene-maleic anhydride copolymer rosin resins were very effective in stabilizing viscosity.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved submicron lignin binder resin composition comprising a colloidal lignin dispersion wherein the lignin is "A" lignin derived from the kraft pulping process and the dispersion is characterized by monodispersed lignin particles exhibiting a median lignin particle diameter size of less than about 300 angstroms, wherein the improvement comprises replacing 10 to 25% by weight of the submicron lignin resin with acrylic resin, rosin resin, styrene-maleic anhydride copolymer resin, or a combination thereof.

2. The improved composition of claim 1 wherein the improvement comprises replacing 12 to 20% by weight of the submicron lignin binder resin with acrylic resin, rosin resin, styrene-maleic anhydride copolymer resin, or a combination thereof.

3. The improved composition of claim 1 wherein the acrylic resins are styrene (α-methylstyrene)-acrylic acid copolymers having a molecular weight in the range of about 1,000 to 100,000 and an acid number in the range of 70 to 250.

4. The improved composition of claim 1 wherein the rosin resins are rosins fortified via a Diels-Alder reaction with fumaric acid or maleic anhydride and further reacted in an esterification reaction with a member of the group consisting of pentaerythritol, glycerol, glycol, polyglycols, sorbitol, or combinations thereof, and the rosin resins have an acid number in the range of 150 to 220.

5. The improved composition of claim 1 wherein the rosin resins are rosins fortified via a Diels-Alder reaction with fumaric acid or maleic anhydride and further reacted with a polyalklene amine selected from the group consisting of aminoethylpiperazine, triethylenetetramine, aminoethylethanolamine, diethylenetriamine, hydroxyethylpiperazine, ethylenediamine, and combinations thereof, wherein the reaction is at ratio of 0.1 to 0.5 moles of polyalklene amine per mole of fumaric acid or maleic anhydride, and the rosin resins have an acid number in the range of 130 to 200.

6. The improved composition of claim 1 wherein the styrene-maleic anhydride copolymer resins have a molecular weight in the range of about 1,000 to 5,000 and an acid number in the range of 150 to 300.

7. A black aqueous printing ink composition comprising black pigment and the improved binder resin composition of claim 1 dispersed in an aqueous medium.

8. A black aqueous printing ink composition comprising black pigment and the improved binder resin composition of claim 2 dispersed in an aqueous medium.

* * * * *